(12) United States Patent
Wiegers et al.

(10) Patent No.: US 12,129,037 B2
(45) Date of Patent: Oct. 29, 2024

(54) HEATING CONTROL SYSTEM AND METHOD FOR UNPRESSURIZED AIRCRAFT

(71) Applicant: Textron Aviation Inc., Wichita, KS (US)

(72) Inventors: Robert Glynn Wiegers, Wichita, KS (US); Clinton Lee Thompson, Wichita, KS (US); Robin L. Young, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 218 days.

(21) Appl. No.: 18/054,624

(22) Filed: Nov. 11, 2022

(65) Prior Publication Data

US 2023/0142953 A1 May 11, 2023

Related U.S. Application Data

(60) Provisional application No. 63/278,177, filed on Nov. 11, 2021.

(51) Int. Cl.
*B64D 13/08* (2006.01)
*B60H 1/00* (2006.01)
*G05D 23/19* (2006.01)
*B64D 13/06* (2006.01)

(52) U.S. Cl.
CPC ........... *B64D 13/08* (2013.01); *B60H 1/0073* (2019.05); *G05D 23/1931* (2013.01); *B64D 2013/0618* (2013.01)

(58) Field of Classification Search
CPC ............ B64D 13/08; B64D 2013/0618; B60H 1/0073; G05D 23/1931; Y02T 50/50
See application file for complete search history.

(56) References Cited

U.S. PATENT DOCUMENTS

| | | | | |
|---|---|---|---|---|
| 4,263,786 A | * | 4/1981 | Eng | B64D 13/06 62/89 |
| 5,137,230 A | * | 8/1992 | Coffinberry | B64D 13/06 244/58 |
| 6,848,652 B2 | | 2/2005 | Palin et al. | |
| 8,985,966 B2 | | 3/2015 | Sampson et al. | |
| 10,752,366 B2 | | 8/2020 | Fernandez-Lopez et al. | |

(Continued)

*Primary Examiner* — Marc E Norman
(74) *Attorney, Agent, or Firm* — AVEK IP, LLC

(57) ABSTRACT

A method for heating an unpressurized aircraft includes receiving a desired air temperature, calculating a target duct air temperature based on the desired air temperature, determining an actual duct air temperature via a duct air temperature sensor, calculating a target modulation of one or more ram air valves based on a difference between the target duct air temperature and the actual duct air temperature, modulating one or more of the ram air valves based on the target modulation, introducing a bleed air from a turbine engine to a heat exchanger, introducing a temperature control air from one of the one or more ram air valves to the heat exchanger for cooling the bleed air to provide a temperature-controlled air, mixing the temperature-controlled air from the heat exchanger with an ejector ram air in an ejector, and providing air from the ejector to an occupied compartment of the unpressurized aircraft.

20 Claims, 7 Drawing Sheets

(56) References Cited

U.S. PATENT DOCUMENTS

| | | | |
|---|---|---|---|
| 2016/0083100 A1* | 3/2016 | Bammann | B64D 13/06 |
| | | | 62/89 |
| 2018/0057170 A1 | 3/2018 | Sautron | |
| 2018/0073431 A1 | 3/2018 | Smith et al. | |
| 2018/0312262 A1 | 11/2018 | Wiegers et al. | |
| 2020/0247548 A1* | 8/2020 | Fagundes | B64D 13/06 |
| 2020/0391872 A1 | 12/2020 | Bruno et al. | |
| 2021/0061476 A1 | 3/2021 | Ende et al. | |
| 2022/0145796 A1* | 5/2022 | Hallisey | F02C 6/08 |
| 2023/0227166 A1* | 7/2023 | Pal | B64D 37/32 |
| | | | 62/79 |
| 2023/0373640 A1* | 11/2023 | Wiegers | B64D 13/08 |

* cited by examiner

HEATING CONTROL SYSTEM AND METHOD FOR UNPRESSURIZED AIRCRAFT

CROSS-REFERENCE TO RELATED APPLICATIONS

This application claims the benefit of priority of U.S. Provisional Patent Application No. 63/278,177, entitled Heating Control System And Method For Unpressurized Aircraft and filed on Nov. 11, 2021, the disclosure of which is herein incorporated by reference in its entirety.

BACKGROUND

1. Field

Embodiments of the invention relate generally to the field of aircraft temperature control systems, and more specifically to systems for controlling heating in unpressurized aircraft.

2. Related Art

Unpressurized aircraft require temperature control of the cockpit and cabin for comfort and safety of the passengers, or for maintaining optimal temperatures for temperature-sensitive cargo. As part of reaching this objective, bleed air is typically extracted from the engine and provided to the occupied compartments to heat said compartments.

Temperature control systems have been provided in a variety of ways in prior aircraft, albeit typically in reference to pressurized aircraft. For example, U.S. Patent Publication 2018/0057170 to Sautron discloses a system of mixing bleed air with a cold air source for an environmental control system. U.S. Patent Publication 2020/0391872 to Bruno et al. discloses a system to regulate cabin air in an aircraft by mixing outside air and bleed air. U.S. Patent Publication 2018/0312262 to Wiegers et al. discloses a pneumatic flow-control system and method to regulate ambient air temperature. U.S. Pat. No. 10,752,366 to Fernandez-Lopez et al. discloses a system for heating an auxiliary power unit compartment of an aircraft. U.S. Patent Publication 2021/0061476 to Van Den Ende et al. discloses a system and method for increasing bleed air flow to a heat exchanger. U.S. Pat. No. 6,848,652 to Palin et al. discloses a heating system that uses bleed air to heat a cabin of an aircraft. U.S. Pat. No. 8,985,966 to Sampson et al. discloses a jet pump apparatus.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a heating system for an unpressurized aircraft includes: a first ram air source configured to provide ram air to a heat exchanger via a first valve; a bleed air source from a turbine engine configured to provide bleed air to the heat exchanger via a second valve, wherein the heat exchange uses the ram air to cool the bleed air; an ejector fluidly coupled downstream of the heat exchanger to receive cooled bleed air from the heat exchanger; a second ram air source configured to provide ram air to the ejector via a third valve, wherein the ejector mixes the second ram air source with the cooled bleed air; a controller operatively connected to the first valve, the second valve, and the third valve; a control panel operatively connected to the controller, including: a heating enable switch, wherein the heating enable switch includes an on configuration and an off configuration; and a temperature selection control, wherein the temperature selection control is configured to receive a desired temperature range; and the controller is configured to regulate air temperature in the unpressurized aircraft by controlling the first, second, and third valves based on the temperature selection control when the heating enable switch is in the on configuration.

In another embodiment, a method for heating an unpressurized aircraft includes: receiving, via a controller, a desired air temperature from a control panel; calculating, via the controller, a target duct air temperature based on the desired air temperature; determining, via the controller, an actual duct air temperature via a duct air temperature sensor disposed in an air duct; calculating a target modulation of one or more ram air valves based on a difference between the target duct air temperature and the actual duct air temperature; modulating one or more of the ram air valves via the controller based on the target modulation; introducing a bleed air from a turbine engine to a heat exchanger; introducing a temperature control air from one of the one or more ram air valves to the heat exchanger for cooling the bleed air to provide a temperature-controlled air; mixing the temperature-controlled air from the heat exchanger with an ejector ram air in an ejector; and providing air from the ejector to an occupied compartment of the unpressurized aircraft via the air duct.

In yet another embodiment, a method for heating an unpressurized aircraft includes: providing a desired air temperature to a controller via a control panel; calculating, via the controller, a target duct air temperature based on the desired air temperature; determining, via the controller, an actual duct air temperature via a duct air temperature sensor; determining a temperature error based on a difference between the actual duct air temperature and the target duct air temperature; calculating a target ejector ram air valve position based on the temperature error; determining a measured ejector ram air valve position from a position sensor; determining a valve error based on the difference between the target ejector ram air valve position and the measured ejector ram air valve position; maintaining a position of an ejector ram air valve when the valve error is less than a predetermined value; and adjusting the position of the ejector ram air valve based on the valve error when the valve error is greater than the predetermined value.

BRIEF DESCRIPTION OF THE DRAWING FIGURES

Embodiments of the invention are described in detail below with reference to the attached drawing figures, wherein.

Figure 1:
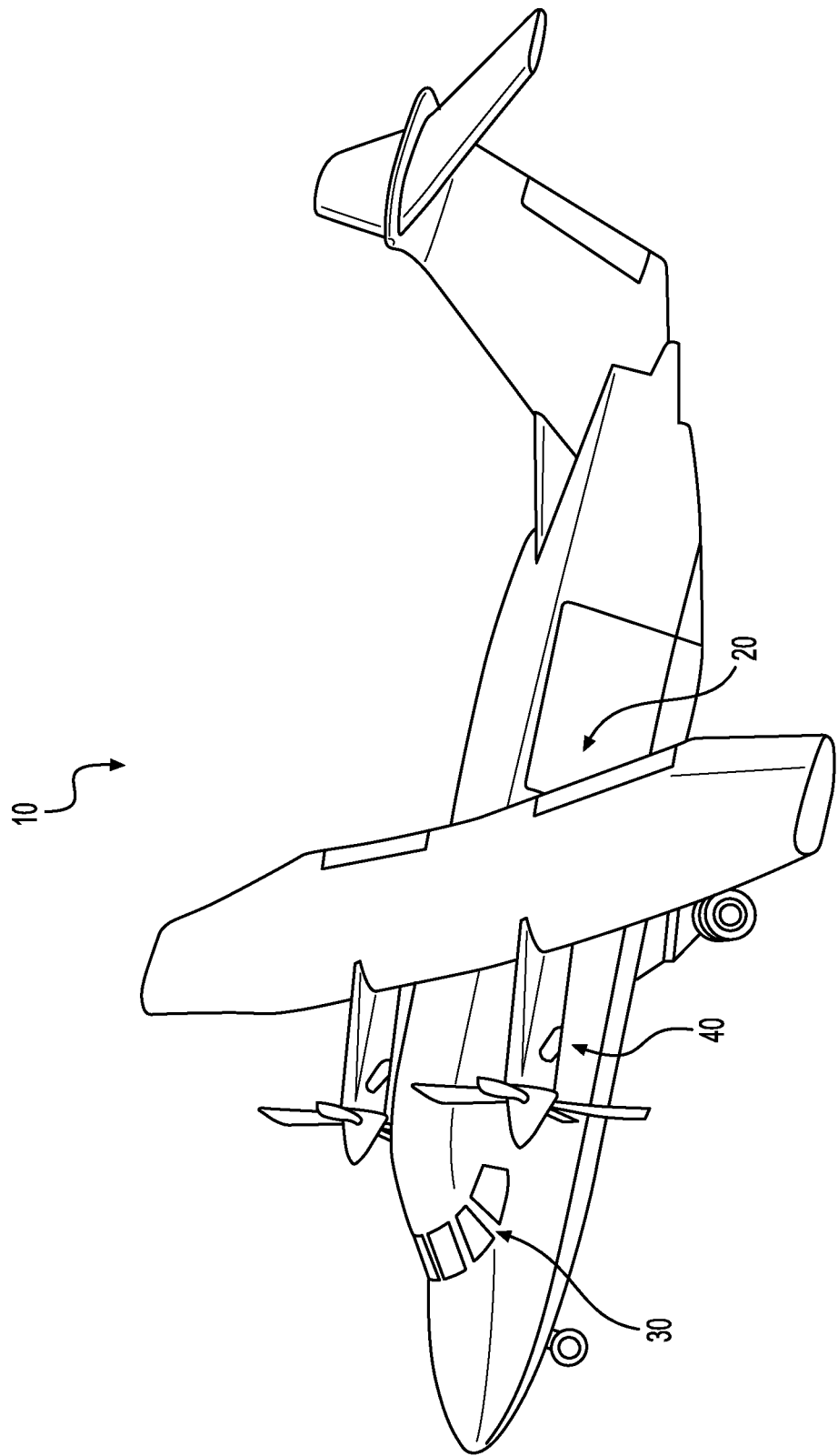
FIG. 1 is a diagram showing an environmental embodiment in an aircraft having a turbine engine and occupiable compartments as shown.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Unpressurized aircraft require that the cabin be ventilated, and temperature controlled to maintain a comfortable environment for the passengers, crew, or temperature-sensitive cargo. Bleed air may be extracted from one or more of the engine's compressor stages to provide a source of high temperature air. Based on the compressor stages used, a range of available bleed air pressures and temperatures may be provided depending on engine power and ambient air conditions. However, extraction of highly compressed bleed air from the later engine compressor stages causes increased engine fuel burn and decreased available thrust. A temperature control system may be used to regulate pressure, flow rate, and temperature of the bleed air that is provided to the aircraft cabin for heating or cooling. The architecture and sizing of the bleed air extraction assembly directly affects engine fuel burn, aircraft performance, and the amount of cooling required from the temperature control system.

A typical turbine engine powered aircraft heating system uses a pressure regulating valve, temperature control valve, and heat exchanger to provide and control heat to the crew and passenger compartment. The temperature of the air is varied by modulating ambient ram air across the cold side of the heat exchanger. For a small cabin, the amount of bleed air extracted off the engine is relatively small, but for a large cabin the amount of bleed air required can be higher than what a turbine engine is able to provide. Even if an engine can provide the amount of bleed air required, as more bleed air is extracted off the engine, the specific fuel consumption increases and the overall aircraft efficiency decreases. As a result, heating systems are typically designed to extract as little bleed air as possible resulting in insufficient heating capability.

For a typical aircraft heating/cooling system, ambient ram air is used to provide a cross flow for a heat exchanger, which allows for acceptable cooling performance in flight. However, when the aircraft is on the ground, ambient ram air is not available for cooling the heat exchanger. The lack of cooling flow can cause the heating system to quickly exceed its operating temperature while heating a stationary aircraft. This is another downside of the simple heating system.

An ejector may be used to reduce the impact of extracting excess bleed air. By mixing ambient or lower pressure bleed air with high pressure bleed air, the overall heating flow rate may be increased while reducing the detrimental effect on engine specific fuel consumption. These ejector systems are typically controlled to a fixed mass flow schedule which allows for a constant cabin pressurization system. However, a fixed mass flow schedule does not adapt to changes in ambient temperature and bleed air temperature, which causes the resultant heating capacity to vary. These types of systems locate the ejector upstream of the heat exchanger so that the air flow quantity can be managed independently from the air temperature.

Figure 2:
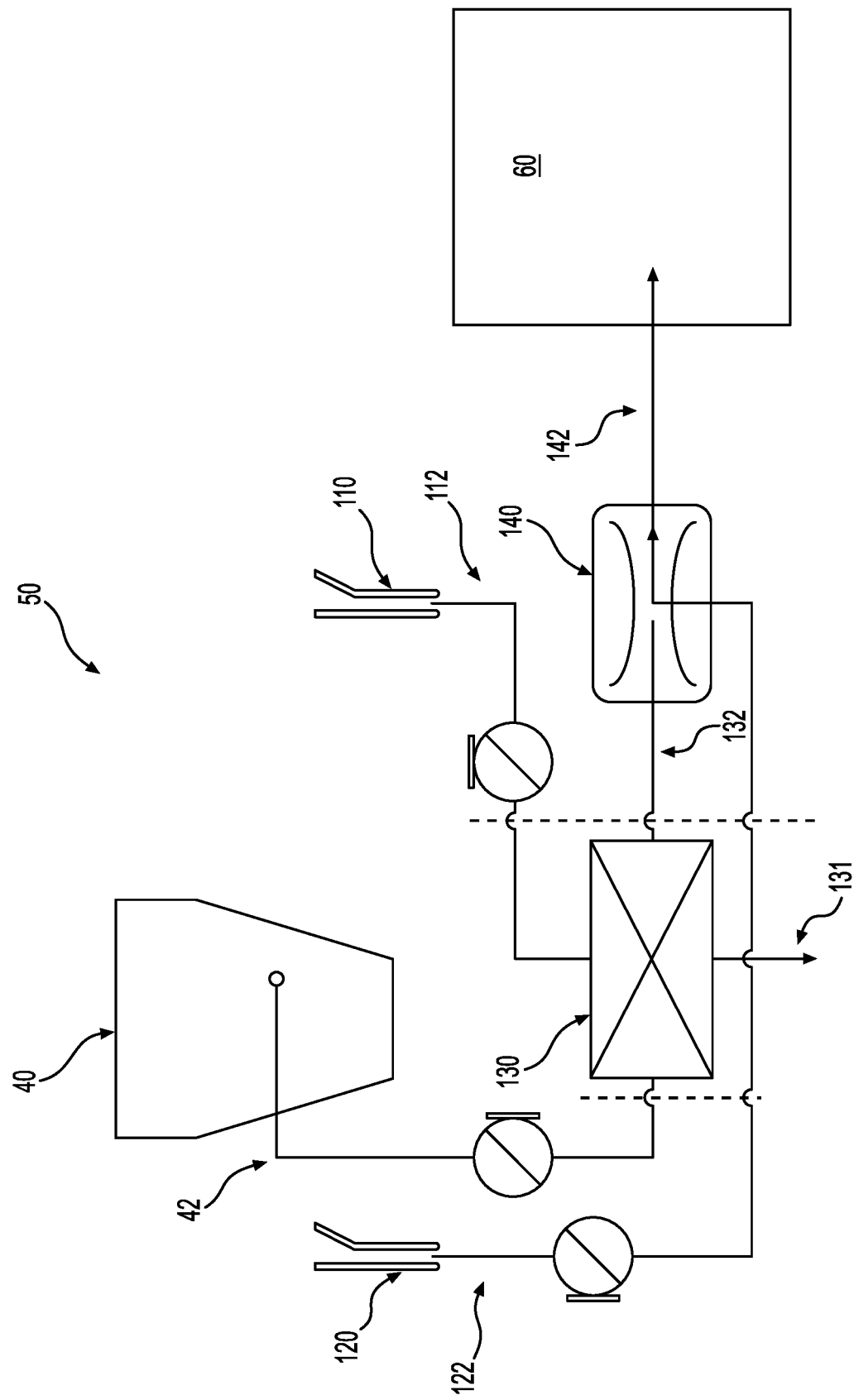
FIG. 2 is a schematic diagram showing one embodiment of a heating system for an unpressurized aircraft.

FIG. 1 shows an aircraft 10 containing a cabin 20 and a cockpit 30, which collectively may represent an occupied compartment 60 (see FIG. 2). The occupied compartment 60 may be occupied by one or more of passengers or cargo. In embodiments, aircraft 10 is an unpressurized aircraft such that occupied compartment 60 is unpressurized. Unpressurized aircraft are typically operated up to altitudes of about 10,000-feet above sea level such that sufficient oxygen is available for crew and passengers without providing pressurization. The aircraft 10 is propelled forwards by one or more turbine engines, (e.g., turbine engine 40). The turbine engine 40 generates bleed air by compressing air as it travels through the engine. The turbine engine 40 may be, for example, a turbofan, turbojet, turboprop, or turboshaft engine. Bleed air temperature and pressure may be regulated based on the type of turbine engine 40, as well as a compression ratio and a compression stage of the engine from which the bleed air is provided.

FIG. 2 depicts a heating system 50 which may control the air temperature of the occupied compartment 60 of the aircraft 10. The heating system 50 has three sources of input air: 1) a bleed air 42 from the turbine engine 40; 2) a temperature control air 112, which enters the system through a temperature control air inlet 110; and 3) an ejector ram air 122 that enters through an ejector ram air inlet 120.

Bleed air 42 from the turbine engine 40 and temperature control air 112 from the temperature control air inlet 110 flow through a heat exchanger 130. The heat exchanger 130 may be a cross flow type of heat exchanger with two primary flow paths, wherein the bleed air 42 flows through a first path and the temperature control air 112 flows through a second path. The cooling air introduced into the heat exchanger 130 from inlet 110 exits the system, e.g., at an aircraft exit duct 131 and into the ambient environment.

The temperature-controlled air 132, now at a reduced temperature, is introduced into an ejector 140. The ejector 140 is a fixed geometry device that operates as a jet pump using the temperature-controlled air 132 from the heat exchanger 130 as a motive flow to induce ambient flow from ejector ram air inlet 120. The temperature-controlled air 132 passes through a fixed nozzle located within the ejector 140 at a high velocity, which results in a low-pressure zone in the ejector ram air 122 from the ejector ram air inlet 120, thereby causing a motive force and flow in the ejector ram air 122. The mixing of the temperature-controlled air 132 with ejector ram air 122 increases the overall ventilation flow while moderating the temperature of the air. Duct air 142 is subsequently distributed to occupied compartment 60 of the aircraft 10. In one embodiment, the occupied compartment 60 comprises the cabin 20 and the cockpit 30. In another embodiment, the occupied compartment 60 comprises the cockpit 30. Alternatively, other occupied spaces might also include the cabin 20 only, or even other occupiable spaces within the aircraft such as a storage compartment. The occupied compartment 60 may be occupied by one or more of passengers or cargo.

Figure 3:
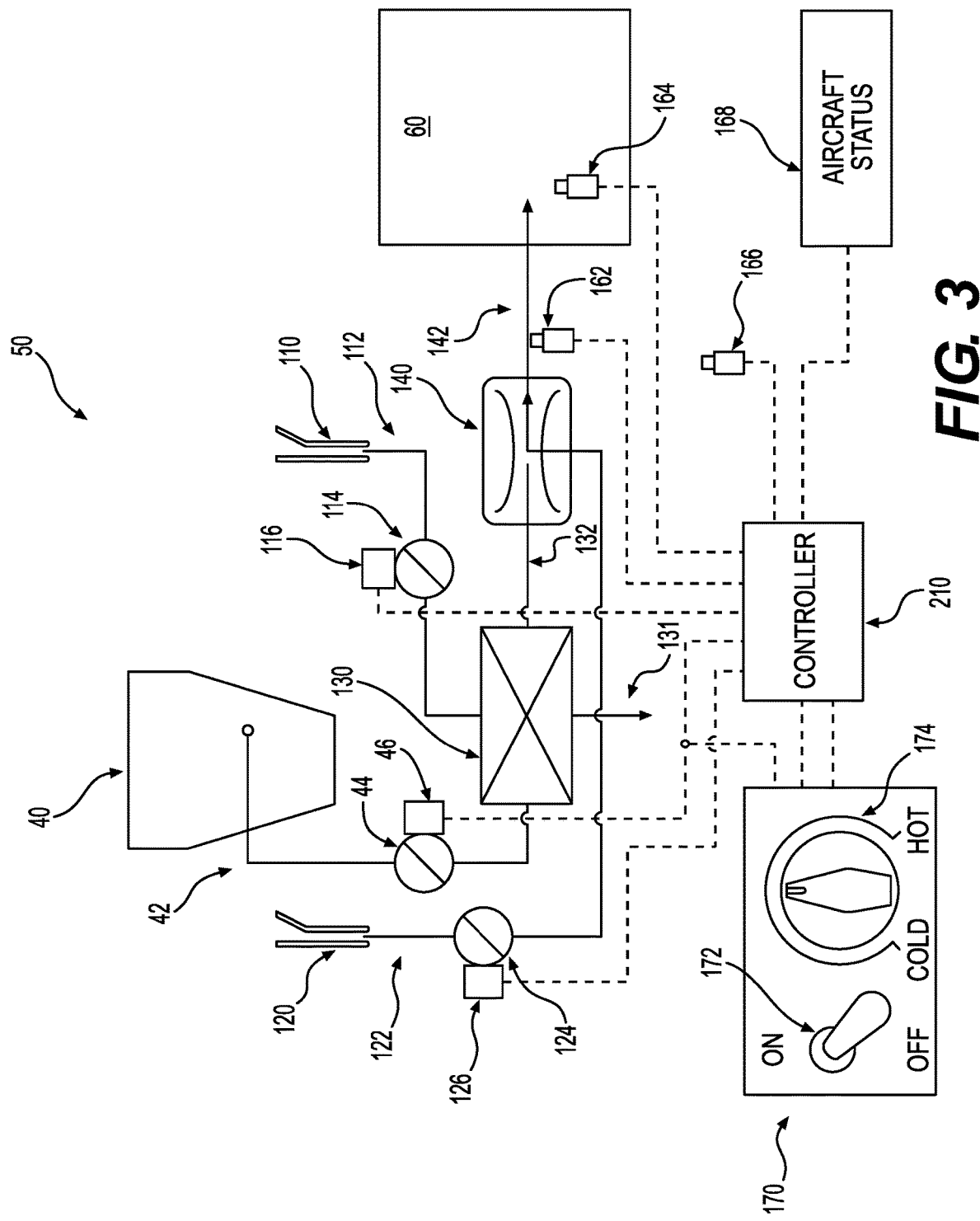
FIG. 3 is a schematic diagram showing another embodiment of a heating system for an unpressurized aircraft.

FIG. 3 shows that the heating system 50 can, in embodiments, be generally regulated by a controller 210. The controller 210 of the heating system 50 receives information from multiple sources to regulate air temperature of the occupied compartment 60. An exemplary controller 210 is described below in connection with FIG. 5. Sources of information may include data related to temperature of the air. Another source of information the controller 210 may receive is data relating to the aircraft's flight stage (e.g., ground, takeoff, cruise, or landing). Other sources of information may include data reflective of altitude, air pressure, speed of the aircraft, etc.

In one embodiment, the controller 210 is fed information on a plurality of different air temperatures. This may include the temperature of the duct air 142 through a duct temperature sensor 162. The controller 210 may receive information on the temperature of the air in the occupied compartment 60 from a compartment temperature sensor 164. The controller 210 may receive information on the temperature of the outside air from an ambient temperature sensor 166. Temperature sensors 162, 164, 166 may each be a thermocouple or a resistive thermal type of device such as a resistive temperature detector (RTD). The controller 210 may also receive information regarding an aircraft status 168 via a wired or wireless communications connection. The information may be provided by a flight computer or aircraft avionics and include data regarding all stages of flight, such as grounded, taxiing, takeoff, cruise, and landing. The controller 210 may also receive information on the aircraft status 168 including turbine engine fire or bleed air leak.

The controller 210 may also receive information on the desired air temperature of the occupied compartment 60 by a control panel 170. The control panel 170 may be operated by a user within the aircraft 10 during any flight stage. The control panel 170 may comprise a heating enable switch 172. The heating enable switch 172 may comprise an on/off function in which, in the off configuration the heating system 50 is not active, whereas in the on configuration the heating system 50 is active. The user, via the control panel 170, may direct the controller 210 to alter air temperature of the occupied compartment 60 when the heating enable switch 172 is in the on configuration. The control panel 170 may include a temperature selection control 174. The temperature selection control 174 is shown as a variable rotary knob but may also be a variable linear input or a variable touch screen selection. In one embodiment, the temperature selection control 174 comprises a potentiometer. A person skilled in the art will appreciate that the temperature selection control 174 may also be any form of variable input in which a range of selection is possible, and the heating enable switch 172 may be any user selection device for controlling a switch. For example, a touch screen or other graphic-user interface (GUI) may be used to provide heating enable switch 172 and to receive a temperature selection from the user.

Figure 4:
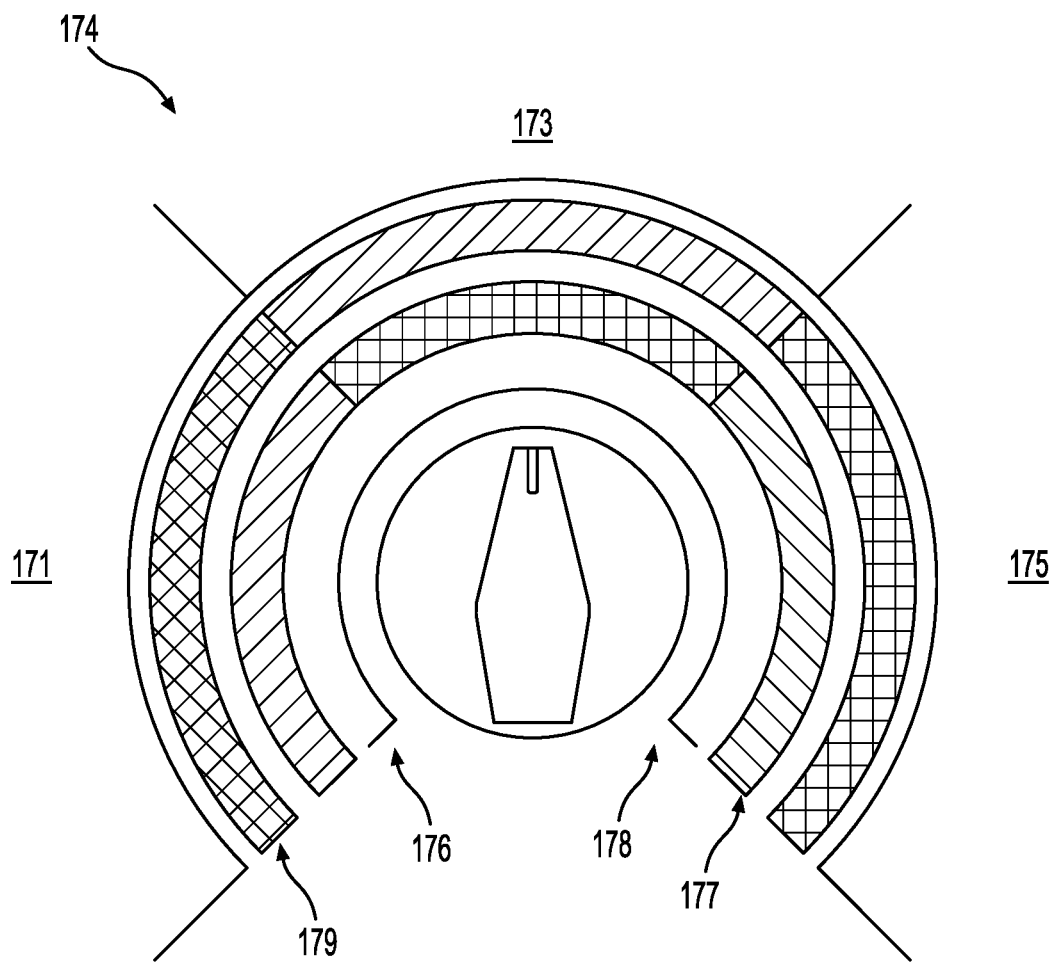
FIG. 4 is a front view of one embodiment of a user-operated temperature selection control for the heating system.

Referring now to FIG. 4, the temperature selection control 174 may comprise a display for displaying a range of desired temperatures, ranging from a full cold selection 176 to a full hot selection 178. In one embodiment, selecting the full cold selection 176 or the full hot selection 178 may be used to provide a safe range of cabin air temperature for passengers or cargo via the heating system 50. For example, the temperature range may be between 65 degrees Fahrenheit to 85 degrees Fahrenheit for passenger comfort. In another embodiment, the temperature range may be between 33 degrees Fahrenheit to 95 degrees Fahrenheit for safely transporting temperature-sensitive cargo.

In an embodiment, the temperature selection control 174 may further comprise predetermined temperature ranges. The predetermined ranges may comprise a cool temperature range 171, a warm temperature range 173, and a hot temperature range 175. In one embodiment, the cool temperature range 171 may be between about 60 to 68 degrees Fahrenheit; the warm temperature range 173 may be between about 68 to 75 degrees Fahrenheit; and the hot temperature range 175 may be between about 75 to 85 degrees Fahrenheit. In one embodiment, the cool temperature range 171 may be between about 70 to 106 degrees Fahrenheit; the warm temperature range 173 may be between about 106 to 142 degrees Fahrenheit; and the hot temperature range 175 may be between about 142 to 185 degrees Fahrenheit.

The temperature selection control 174 may further comprise a warm outside air temperature control input 177 and a cold outside air temperature control input 179. The warm outside air temperature control input 177 and the cold outside air temperature control input 179 are selected by the controller 210 based on the outside air temperature and predetermined temperatures inputted into the controller 210. In one example, the predetermined temperature range for the cold outside air temperature control input 179 may be any temperature below or up to 0 degrees Fahrenheit. In one example, the predetermined temperature range for the warm outside air temperature control input 177 may be any temperature above 0 degrees Fahrenheit. The cool temperature range 171, the warm temperature range 173, or the hot temperature range 175, in combination with the warm outside air temperature control input 177 or the cold outside air temperature control input 179, may direct the controller 210 to select target valve positions and/or valve duty cycles as described below in controllable heating methods 300/400 and shown in FIGS. 6 and 7.

When setting a target temperature of the air in the occupied compartment, via the temperature selection control 174, the controller 210 may calculate a target duct temperature. The heating system 50 is used to adjust the temperature of the occupied compartment 60 via the controller 210 based on the target duct temperature, the target occupied compartment temperature, or both, as described below.

Returning to FIG. 3, the controller 210 may receive input from the duct temperature sensor 162, the compartment temperature sensor 164, the ambient temperature sensor 166, the aircraft status 168, and the control panel 170 to subsequently regulate the air temperature of the occupied compartment 60. The controller 210 regulates the temperature of the occupied compartment 60 by controlling a plurality of valve-actuators. In embodiments, each of the valve-actuators includes a valve actuated by an electric motor. As depicted in FIG. 3, a bleed air motor 46 is configured to actuate a bleed air valve 44 that regulates the air flow of the bleed air 42 from the turbine engine 40, a temperature control air motor 116 is configured to actuate a temperature control valve 114 that regulates the flow of the temperature control air 112 from the temperature control air inlet 110, and an ejector ram air motor 126 is configured to actuate an ejector ram air valve 124 that regulates the ejector ram air 122 from the ejector ram air inlet 120. The plurality of valve-actuators each have a plurality of positions ranging from fully open (e.g., positioned at 90 degrees) to fully closed (e.g., positioned at 0 degrees). Said another way, the valves may be quarter-turn valves operable to any angle between 0 degrees to 90 degrees to provide fully closed, fully open, or partially open positions. The valves used to regulate air flow from each inlet may take the form of a ball, butterfly, poppet, or gate-type valve. The valves may also be controlled via different mechanisms. In one embodiment, a valve may be pneumatically actuated open by upstream pressure. For example, bleed air valve 44 may be pneumatically controlled without a feedback loop. In one embodiment, a valve may be electrically actuated using a downstream pressure transducer for pressure feedback. In one embodiment, a valve may be a brushed or brushless electrical motor driven valve. In one embodiment, a valve may be pneumatically actuated by a torque motor. Furthermore, in one embodiment a valve may have position feedback via a resolver. In one embodiment, a valve may have position feedback via a rotary variable differential transformer (RVDT). A person skilled in the art will appreciate that numerous other types of valves used to modulate airflow through an orifice may be used.

Figure 5:
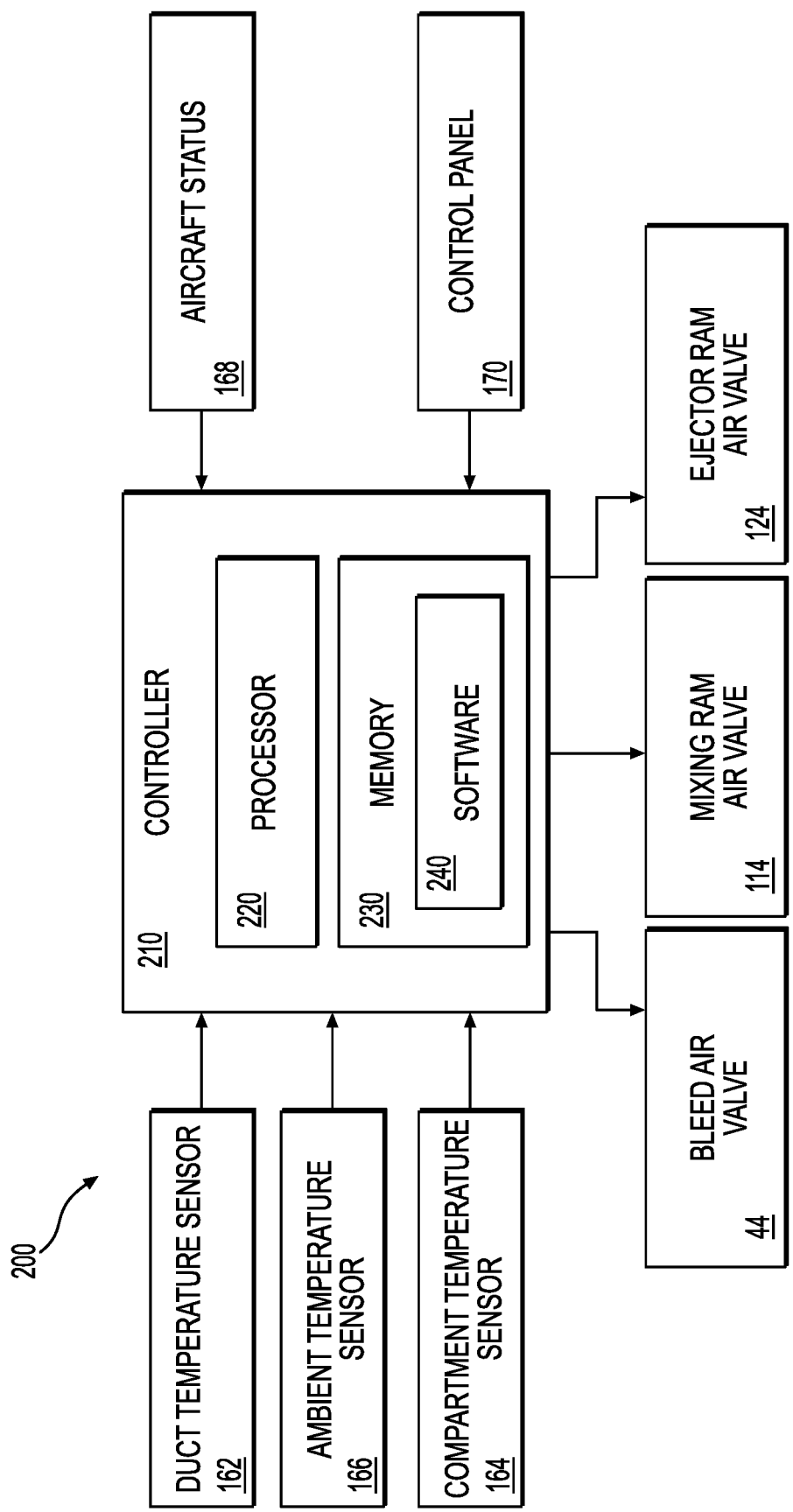
FIG. 5 is a block diagram illustrating a control architecture for controlling components of the systems of FIGS. 2-4, in an embodiment.

FIG. 5 shows an exemplary control architecture 200 for controlling air mixing using the heating system 50. Control architecture 200 includes a controller 210 communicatively coupled to the devices of the heating system 50. The devices may include components of the heating system 50, including the duct temperature sensor 162, ambient temperature sensor 166, compartment temperature sensor 164, aircraft status 168, control panel 170, bleed air valve 44, temperature control valve 114, and ejector ram air valve 124. Controller 210 is typically a microcontroller, a microprocessor, or programmable logic controller (PLC), but could also be a computer (e.g., the aircraft flight control computer or a separate computer), having a memory 230, including a non-transitory medium for storing software 240, and a processor 220 for executing instructions of software 240. In certain embodiments, some, or all of software 240 is configured as firmware for providing low-level control of devices of the heating system 50. Communication between controller 210 and devices of heating system 50 may be by one of a wired and/or wireless communication media.

Controller 210 determines the temperature of the duct air 142, the occupied compartment 60, and the outside ambient air based on data received from the duct temperature sensor 162, compartment temperature sensor 164, and ambient temperature sensor 166, respectively. Controller 210 receives aircraft information via the aircraft status 168. The user will direct the controller 210 via the control panel 170, to alter the air temperature of the occupied compartment 60. Controller 210 will then alter the configuration of one or more of the bleed air valve 44, temperature control valve 114, and/or ejector ram air valve 124 to achieve the desired air temperature within the occupied compartment 60 as set by the user. The controller 210 may alter the configuration of the valves by various mechanisms. For example, the controller 210 may set a valve position that is maintained until a new valve position is instructed by the controller. In another example, the controller 210 may enact a duty cycle in which the valve is modulated towards the open or closed direction for a specified amount of time over a certain period of time. For instance, the valve may be moved in the open direction for two seconds and held in place for one second, which may repeat for a period of ten minutes.

Figure 6:
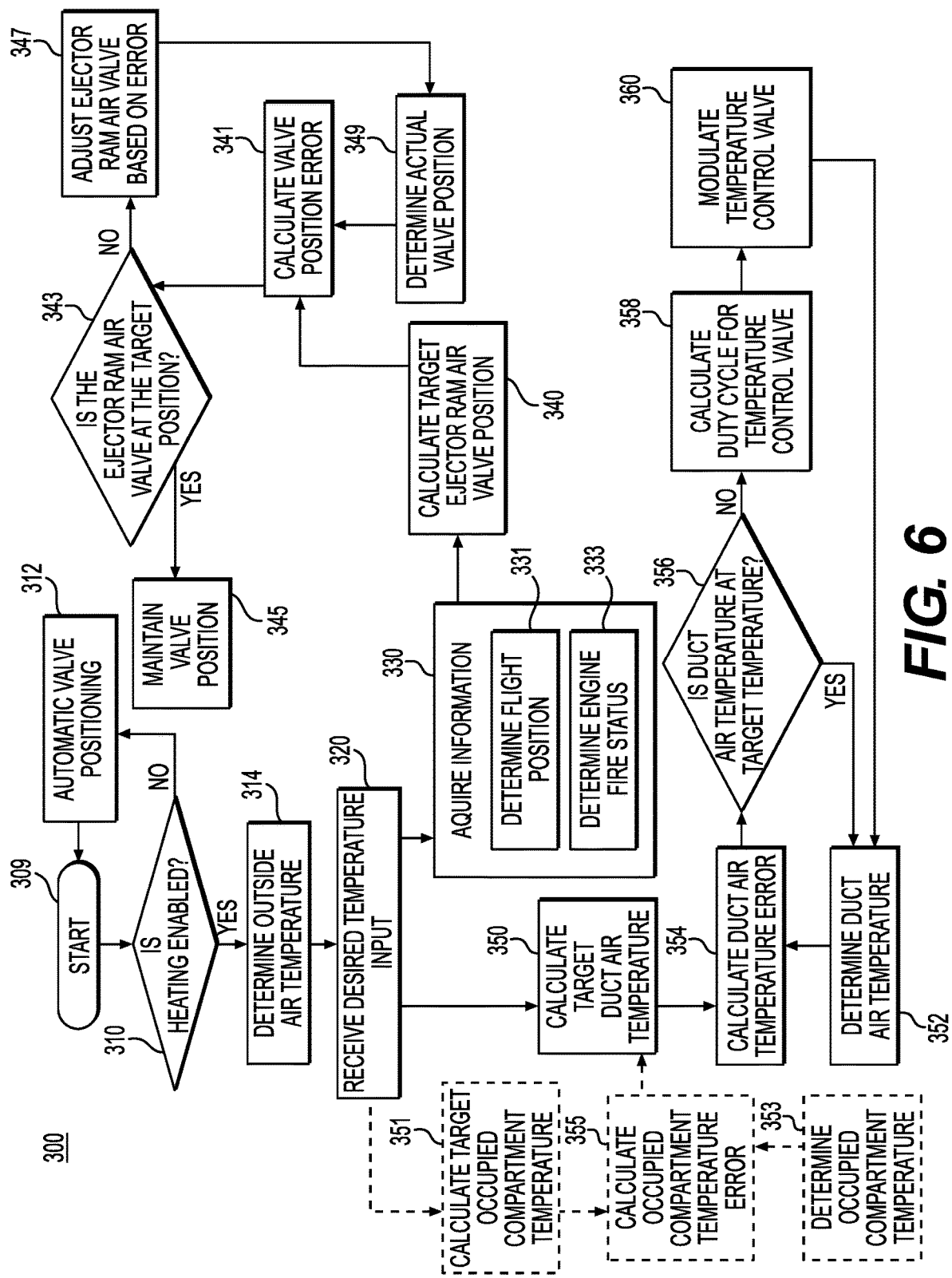
FIG. 6 is a process-flow diagram illustrating a heating method performed using the system of FIGS. 2-4, in an embodiment.
Figure 7:
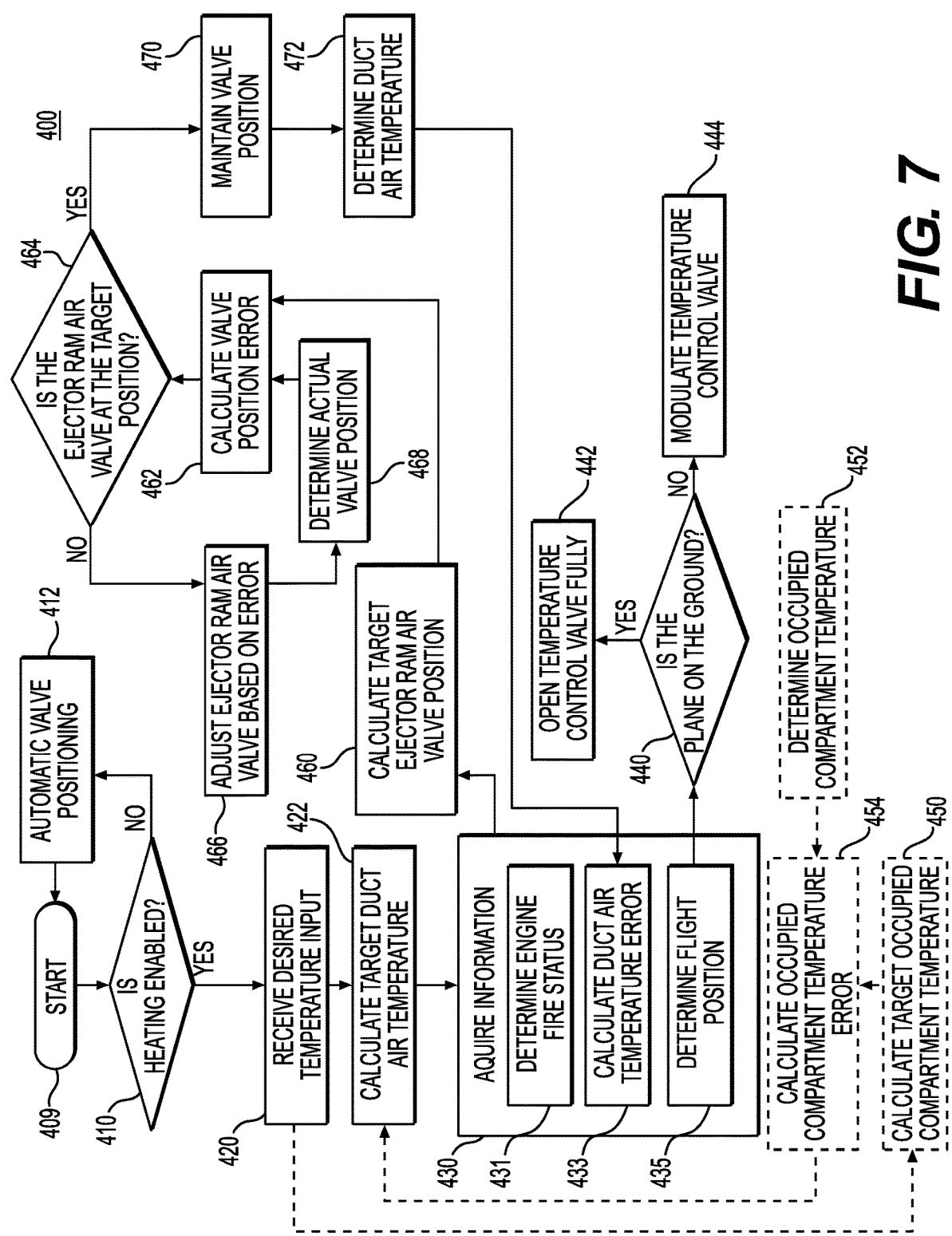
FIG. 7 is a process-flow diagram illustrating a heating method performed using the system of FIGS. 2-4, in an embodiment.

In one embodiment, the desired air temperature may be obtained by determining a target valve position of the ejector ram air valve 124 and a duty cycle for the temperature control valve 114 based on information input into the controller 210, such as depicted in FIG. 6. In this embodiment, the controller 210 may operate a closed loop control system in which one or more of the duct air 142 temperature or the occupied compartment 60 temperature may affect the controller's 210 calculation of the target valve position or the duty cycle. In one embodiment, the desired air temperature may be obtained by determining a target valve position of the ejector ram air valve 124, such as depicted in FIG. 7. In this embodiment, the controller 210 may configure a closed loop system, wherein one or more of the duct air 142 temperature or the occupied compartment 60 temperature may affect the controller's 210 calculation of the target valve position. The response of the plurality of valves is determined using one or more valve sensors for each valve. Determining a response via the valve sensor may include for example determining an instantaneous position or a rate of response of the valve. In an embodiment, the valve sensors comprise one or more of a resolver or a RVDT. Controller 210 may include any type of suitable controller, including analog or digital, for controlling the plurality of valves.

Controller 210 executes control algorithms that may include a feedback mechanism which depends on a difference or error term between a desired air temperature and a measured air temperature from one or more of the duct air 142 or the occupied compartment 60. In an embodiment, the controller 210 includes a proportional-integral-derivative (PID) control algorithm in which the proportional term adjusts the position of the valves in proportion to the magnitude of the error term, the integral term adjusts the position of the valves in proportion to both the magnitude and the duration of the error term by integrating over time to account for any cumulative error, and the derivative term adjusts the position of the valves in proportion to the rate of change of the error term over time. The terms are weighted based on gains (e.g., coefficients), which may be tuned to provide a stable valve position with a minimal error term. In another embodiment, the controller 210 is a proportional-integral (PI) controller in which the derivative term is not used (e.g., set to zero). In another embodiment, the controller 210 is a proportional (P) controller in which the derivative term and the integral term are not used. In certain embodiments, the valve position feedback may be used as a surrogate for rate feedback (e.g., derivative controller action).

The controller 210 reduces the error term based on feedback from the temperature sensors 162, 164, and 166, as well as the valve sensors, which may be used to improve performance of the heating system 50 in addition to avoiding unsafe deflection of the valves.

FIG. 6 is a process flow diagram illustrating an exemplary controllable heating method 300 in an embodiment, performed using, for example, the heating system 50 of FIG. 3.

In a step 309, the controllable heating method 300 starts.

Step 310 is a decision to determine whether heating has been enabled. For example, if in step 310 the heating enable switch 172 is in the off configuration, then the controllable heating method 300 proceeds to step 312. If in step 310 the heating enable switch 172 is in the on configuration, then controllable heating method 300 proceeds with step 314.

In a step 312, the valves are automatically positioned. In embodiments, the valves 44, 114, 124 are automatically positioned based on predetermined criteria instead of input from temperature selection control 174. In an example of step 312, if in step 310 the heating enable switch 172 is in the off configuration, the controller 210 directs the ejector ram air motor 126 to position the ejector ram air valve 124 to fully closed (e.g., at 0 degrees), the controller 210 directs the bleed air motor 46 to position the bleed air valve 44 to fully closed (e.g., at 0 degrees) and the controller 210 directs the temperature control air motor 116 to position the temperature control valve 114 to fully open (e.g., at 90 degrees). The valves remain as such until the heating enable switch 172 is changed to the on configuration. In some embodiments, the controller 210 periodically returns to the start step 309 and then rechecks whether heating has been enabled in step 310.

In a step 314, the outside air temperature is determined. In an example of step 314, the controller 210, via the ambient temperature sensor 166, determines that the outside air temperature is 30 degrees Fahrenheit.

In a step 320, a desired temperature input is received. In an example of step 320, the controller 210 receives a desired temperature input from the temperature selection control 174. The temperature selection control 174 may be operated by a user to, for example, increase the temperature by adjusting the knob away from the full cold selection 176 and towards the full hot selection 178. Controllable heating method 300 may proceed to step 330 and step 350 concurrently, and optionally to step 351 in some embodiments as described below.

In a step 330, information is acquired about the unpressurized aircraft via various steps. In an example of step 330, steps 331 and 333 are performed by the controller 210 to acquire various information. In an example of step 330, the controller 210 may receive information continuously. In another example of step 330, the controller 210 may acquire information on a predetermined schedule (e.g., once a second, once a minute, etc.).

In a step 331, the aircraft flight position is determined. In an example of step 331, the controller 210, via the aircraft status 168 of FIG. 3, determines the flight position to be on the ground. In another example of step 331, the controller 210, via the aircraft status 168, determines the flight position to be in air. For the in air flight position, the controller 210 may automatically override method 300 and direct the ejector ram air motor 126 to position the ejector ram air valve 124 in the flight position. The flight position of ejector ram air valve 124 may be a set angle to avoid conflict with the temperature control valve 114. For example, the flight position of the ejector ram air valve 124 may be a set angle to provide a constant inflow to the occupied compartment 60 that varies with altitude, which avoids undesirable interaction with control of the temperature control valve 114. In some embodiments, the flight position may be between about 10 degrees to about 40 degrees. In some embodiments, the flight position may be between about 15 degrees to about 35 degrees. In some embodiments, the flight position may be about 25.5 degrees.

In a step 333, the engine fire status is determined. In an example of step 333, the controller 210 determines there is no engine fire. In another example of step 333, the controller 210 determines there is an engine fire. In the case of an engine fire, the controller 210 may automatically override method 300 and direct the ejector ram air motor 126 to position the ejector ram air valve 124 at fully closed (e.g., 0 degrees).

In a step 340, the target ejector ram air valve position is calculated. In an example of step 340, the controller 210 determines the target ejector ram air valve 124 position for controlling an amount of ejector ram air 122 that enters through ejector ram air inlet 120. In embodiments, the controller 210 determines that the target ejector ram air valve 124 position is one-third open (e.g., about a 30 degree angle). This target position is calculated by the controller 210 based on the input from steps 314, 320, and 330. For example, if in step 320 the temperature selection control 174 is directed towards the warm temperature range 173, and in step 314 the outside air temperature is determined to be within the predetermined range for the cold outside air temperature control input 179, then a target position is calculated for the ejector ram air valve 124 based on these inputs to provide a target amount of ejector ram air 122 that enters through ejector ram air inlet 120. This target position may be the same or different for any other combination of the cool temperature range 171, the warm temperature range 173, or the hot temperature range 175, and the cold outside air temperature control input 179 or the warm outside air temperature control input 177. Calculations in step 340 may also comprise computations for determining a speed at which to open the ejector ram air valve 124.

In a step 349, the actual valve position of the ejector ram air valve is determined. In an example of step 349, the controller 210, based on a signal from a resolver or a RVDT, determines the actual position of the ejector ram air valve 124 is about 40 degrees.

In a step 341, the ejector ram air valve position error is calculated. The valve position error is the difference between the target valve position from step 340 and the actual valve position from step 349. In an example of step 341, the controller 210 calculates that the valve position error is about 10 degrees.

Step 343 is a decision to determine if the position of the ejector ram air valve matches the target position calculated in step 340. If in step 343 the controller 210 determines the error term of the position of the valve is greater than a predetermined absolute value, then controllable heating method 300 proceeds to step 347 to adjust the position of the ejector ram air valve 124. If in step 343, the controller 210 determines the position of the ejector ram air valve 124 matches the target position (i.e., the error term is below the predetermined absolute value), then controllable heating method 300 proceeds to step 345.

In a step 345, the position of the ejector ram air valve 124 is maintained. In an example of step 345, controller 210 directs the ejector ram air motor 126 to maintain the position of the ejector ram air valve 124 at one-third open (e.g., at an angle of 30 degrees) for a predetermined duration. Step 345 may also continuously monitor method 300 for a new desired temperature input. Alternatively, step 345 may monitor method 300 at a predetermined rate or following a predetermined duration to determine if a new desired temperature input has been received.

In a step 347, the ejector ram air valve is adjusted based on the error term. In embodiments, the ejector ram air valve 124 is adjusted based on an amount that is proportional to the size of the error term. In an example of step 347, the controller 210 directs the ejector ram air motor 126 to position the ejector ram air valve 124 at one-third open (e.g., about an angle of 30 degrees).

Controllable heating method 300 then proceeds back to step 349. By proceeding back to step 349, the controller 210 forms a closed control loop in which steps 341, 343, 347, and 349 are repeated to adjust the position of the ejector ram air valve 124 until the error term is below a predetermined value. The closed control loop may be a PID control loop, for example. In one embodiment, the closed control loop may be a PI control loop. In one embodiment, the closed control loop may be a P control loop.

In a step 350, the target duct air temperature is calculated. In an example of step 350, in one embodiment, the controller 210, using the information from step 320, and optionally from step 355, calculates that the target temperature of the duct air 142 is 120 degrees Fahrenheit. In some embodiments, the target temperature of the duct air 142 is higher than the desired temperature inputted in step 320, therein allowing efficient heating of the occupied compartment 60.

In a step 352, the temperature of the duct air is determined. In an example of step 352, the controller 210, via the duct temperature sensor 162, determines that the duct air 142 temperature is 130 degrees Fahrenheit.

In a step 354, the duct air temperature error is calculated. In an example of step 354, based on steps 350 and 352, the controller 210 calculates the difference (i.e., error) between the target temperature (e.g., 120 degrees Fahrenheit) and the actual temperature (e.g., 150 degrees Fahrenheit) of duct air 142.

Step 356 is a decision to determine if the duct air temperature is at the target temperature. In an example of step 356, the controller 210, using information from step 350 and step 354, determines that the actual temperature is not at the target temperature of the duct air 142 (i.e., the error term is above a predetermined value). In this case, controllable heating method 300 proceeds to step 358 to calculate a duty cycle for the temperature control valve 114. If in step 356, the controller 210 determines the actual temperature of the duct air 142 matches the target temperature (i.e., the error term is below a predetermined value), then controllable heating method 300 proceeds back to step 352 to continue monitoring the temperature of the duct air 142. This way, if there is an alteration in the temperature of the duct air 142 such that it falls outside of the error term, controllable heating method 300 may then proceed with the closed control loop described above to adjust the temperature of the duct air 142 accordingly. Such feedback may proceed indefinitely unless otherwise directed by a change in input to the controller 210.

In a step 358, the duty cycle for the temperature control valve is calculated. In an example of step 358, the controller 210, based on the temperature error of the duct air 142 calculated in step 354, determines the duty cycle of the temperature control valve 114 to be moved in the open direction for two seconds and held in place for one second (e.g., a 2:1 duty cycle), which will be repeated for a predetermined period of time (e.g., one minute). In step 358, the calculated duty cycle of the temperature control valve 114 may be any number of possible combinations of open or closed commands for specified periods of time. The controller 210 calculates the duty cycle that efficiently adjusts the temperature of duct air 142 to the target temperature determined in step 350.

In a step 360, the temperature control valve is modulated. In an example of step 360, based on the calculated duty cycle from step 358, the temperature control valve 114 is modulated by means of the controller 210 directing the temperature control air motor 116 to move the temperature control valve 114 in the open direction for two seconds then hold it in place for one second. This opening and closing is set to repeat for a predetermined period of time or until otherwise adjusted by the controller 210. It is contemplated that other methods of opening and closing the temperature control valve 114 (e.g., specific angles) may be used to regulate the amount of temperature control air 112 that reaches the heat exchanger 130. Controllable heating method 300 then proceeds to back to step 352 to determine the temperature of the duct air 142. By proceeding back to step 352, the controller 210 subsequently repeats step 354 to determine the error between the target temperature and actual temperature, step 356 to determine the temperature of the duct air 142, step 358 to calculate a duty cycle for the temperature control valve 114, and step 360 to modulate the temperature control valve 114; the controller 210, therein, forms a closed control loop in which steps 352, 354, 356, 358, and 360 are repeated to adjust the duty cycle of the temperature control valve 114 until the error term is below a predetermined value. The closed control loop may be a PID control loop, for example. In one embodiment, the closed control loop may be a PI control loop. In one embodiment, the closed control loop may be a P control loop.

The controllable heating method 300 may repeat continuously or on a predetermined schedule (e.g., once a second, once a minute, etc.) to reach and maintain the desired temperature.

In some embodiments, optional steps 351, 353, and 355 are performed in which an occupied compartment temperature is used to inform the calculation of the target duct air temperature in step 350. These optional steps may be used to provide a more accurate temperature control for the compartment 60 compared to only measuring the duct air temperature.

In an optional step 351, the target occupied compartment temperature is calculated. In an example of step 351, the controller 210 calculates that the target occupied compartment 60 temperature is 75 degrees Fahrenheit. The controller 210 may calculate this based on the positioning of the temperature selection control 174 in step 320.

In an optional step 353, the occupied compartment temperature is determined. In an example of step 353, the controller 210 via the compartment temperature sensor 164 determines that the measured temperature of the occupied compartment 60 is about 65 degrees Fahrenheit.

In an optional step 355, the occupied compartment temperature error is calculated. In an example of step 355, based on steps 351 and 353, the controller 210 calculates the difference between the target temperature (e.g., 75 degrees Fahrenheit) and the actual temperature (e.g., 65 degrees Fahrenheit) of the occupied compartment 60. If optional step 355 is performed, controllable heating method 300 provides the occupied compartment temperature error value to step 350.

Optional steps 351, 353, and 355 may be performed continuously while controllable heating method 300 is ongoing. In this embodiment, it may be advantageous for the temperature of the occupied compartment 60 to be measured and used for calculating the target duct air temperature, thereby indirectly affecting the modulation of the temperature control valve 114 in step 360. For example, if the temperature of the occupied compartment 60 is approaching the desired temperature received in step 320, controllable heating method 300 may adjust the calculations of the target temperature of the duct air 142 in step 350 (e.g., lowering the target temperature of the duct air 142). As such, controllable heating method 300 may help to prevent overshooting the desired temperature and therefore requiring a readjustment. Thus, optional steps 351, 353, and 355 may not be required for the proper functioning of controllable heating method 300 but may offer advantages as described above.

FIG. 7 is a process flow diagram illustrating an exemplary controllable heating method 400 performed using, for example, the heating system 50 of FIG. 3.

In a step 409, the controllable heating method 400 starts.

Step 410 is a decision to determine whether heating has been enabled. For example, if in step 410 the heating enable switch 172 is in the off configuration, then the controllable heating method 400 proceeds to step 412. If in step 410 the heating enable switch 172 is in the on configuration, then the controllable heating method 400 proceeds with step 420.

In a step 412, the valves are automatically positioned. In an example of step 412, if in step 410 the heating enable switch 172 is in the off configuration, the controller 210 directs the ejector ram air motor 126 to position the ejector ram air valve 124 at fully closed (i.e., 0 degrees) and the controller 210 directs the temperature control air motor 116 to position the temperature control valve 114 at fully open (i.e., 90 degrees). The valves remain as such until the heating enable switch 172 is changed to the on configuration. In some embodiments, the controller 210 periodically returns to the start step 409 and then rechecks whether heating has been enabled in step 410.

In a step 420, a desired temperature input is received. In an example of step 420, the controller 210 receives a desired temperature input from the temperature selection control 174. In one embodiment, the temperature selection control 174 is the same as the embodiment shown in FIG. 6. In one embodiment, the temperature selection control 174 is different than the embodiment shown in FIG. 6 in that the options for outside air temperature control inputs 177 and 179 are not included. The temperature selection control 174 may be operated by a user to, for example, increase the temperature by adjusting the knob away from the full cold selection 176 and towards the full hot selection 178. In embodiments, controllable heating method 400 may then proceed to step 422. In one embodiment, controllable heating method 400 may concurrently proceed to an optional step 450 as described below.

In a step 422, the target duct air temperature is calculated. In an example of step 422, in one embodiment, the controller 210, using the information from step 420, and optionally from step 454, calculates that the target temperature of the duct air 142 is 120 degrees Fahrenheit. In one or more examples, the target temperature of the duct air 142 is higher than the desired temperature inputted in step 420, therein allowing efficient heating of the occupied compartment 60.

In a step 430, information is acquired about the unpressurized aircraft via various steps. In an example of step 430, steps 431, 433, and 435 are performed by the controller 210 to acquire various information. In an example of step 430, the controller 210 may receive information continuously. In another example of step 430, the controller 210 may acquire information on a predetermined schedule (e.g., once a second, once a minute, etc.).

In a step 431, the engine fire status is determined. In an example of step 431, the controller 210 determines there is no engine fire. In another example of step 431, the controller 210 determines there is an engine fire. In this example, the controller 210 may automatically override method 400 and position the ejector ram air valve 124 at fully closed (i.e., 0 degrees).

In a step 433, the temperature error of the duct air is determined. In an example of step 433, the controller 210, via the duct temperature sensor 162, determines that the actual temperature of the duct air 142 is 100 degrees Fahrenheit. Controller 210 then calculates the difference between the actual temperature (e.g., 100 degrees Fahrenheit) and the target temperature (e.g., 120 degrees Fahrenheit) calculated in step 422.

In a step 435, the flight position is determined. In an example of step 435, the controller 210, via the aircraft status 168, determines the flight position to be in air. In another example of step 435, the controller 210, via the aircraft status 168, determines the flight position to be on the ground.

Step 440 is a decision step to determine if the plane is on the ground. If in step 440, the controller 210, via the aircraft status 168, determines the plane is on the ground, then controllable heating method 400 proceeds to step 442. If in step 440, the controller 210, via the aircraft status 168, determines the plane is in the air, then controllable heating method 400 proceeds to step 444.

In a step 442, the temperature control valve is opened. In an example of step 442, the controller 210 directs the temperature control air motor 116 to position the temperature control valve 114 to fully open (i.e., at 90 degrees). This step is directed to allowing as much temperature control air 112 in through the temperature control air inlet 110 to reach the heat exchanger 130 while the plane is on the ground.

In a step 444, the temperature control valve is modulated. In an example of step 444, the controller 210 directs the temperature control motor 116 to adjust the temperature control valve 114 by means of moving the valve towards the open direction for 1 second and holding the valve in place for 2 seconds. This duty cycle may repeat for a predetermined amount of time. Additionally, this duty cycle may be adjusted by the controller 210 if different input is received.

In a step 460, the target ejector ram air valve position is calculated. In an example of step 460, if in step 435 the controller determines the flight position to be in the air, then the controller 210 determines the target ejector ram air valve 124 position for controlling an amount of ejector ram air 122 that enters through ejector ram air inlet 120. In embodiments, the controller 210 determines that the target ejector ram air valve 124 position is one-third open (e.g., about a 30 degree angle). This target position is calculated by the controller 210 based on the input from steps 420, 422, and 430. For example, if in step 435 the controller 210 determines the flight position to be on the ground, then controller 210 uses the duct air temperature error determined in step 433 to calculate the target ejector ram air valve 124 position. Controller may then proceed to step 468. Calculations in step 460 may also comprise computations for determining a speed at which to open the ejector ram air valve 124.

In a step 468, the actual valve position is determined. In an example of step 468, the controller 210, via a signal from a resolver or a RVDT, determines the actual position of the ejector ram air valve 124 is about 40 degrees.

In a step 462, the ejector ram air valve position error is calculated. This error is the difference between the target position from step 460 and the actual position of the ejector ram air valve from step 468. In an example of step 462, the controller 210 calculates that the position error of the ejector ram air valve 124 is about 10 degrees.

Step 464 is a decision to determine if the position of the ejector ram air valve matches the target position. If in step 464 the controller 210 determines the error term of the position of the valve is greater than a predetermined absolute value, then controllable heating method 400 proceeds to step 466 to adjust the position of the ejector ram air valve 124. If in step 464, the controller 210 determines the position of the ejector ram air valve 124 matches the target position (e.g., the error term is below the predetermined absolute value), then controllable heating method 400 proceeds to step 470.

In a step 466, the ejector ram air valve is adjusted based on the error term. In embodiments, the ejector ram air valve 124 is adjusted based on an amount that is proportional to the size of the error term. In an example of step 466, the controller 210 directs the ejector ram air motor 126 to position the ejector ram air valve 124 at one-third open (e.g., about an angle of 30 degrees).

Controllable heating method 400 then proceeds back to step 468. By proceeding back to step 468, the controller 210 forms a closed control loop in which steps 462, 464, 466, and 468 are repeated to adjust the position of the ejector ram air valve 124 until the error term is below a predetermined value. The closed control loop may be a PID control loop, for example. In one embodiment, the closed control loop may be a PI control loop. In one embodiment, the closed control loop may be a P control loop.

In a step 470, the ejector ram air valve position is maintained. In an example of step 470, controller 210 directs ejector ram air motor 126 to maintain the position of the ejector ram air valve 124 for a predetermined duration (e.g., 1 minute).

In a step 472, the temperature of the duct air is determined. In an example of step 472, the controller 210, via the duct temperature sensor 162, determines that the duct air 142 temperature is 100 degrees Fahrenheit. Controllable heating method 400 then proceeds back to step 433 to calculate the temperature error of the duct air 142. By proceeding back to step 433, the controller 210 forms a closed control loop in which steps 433, 460, 462, 464, 466, 468, 470, and 472 are repeated to adjust the position of the ejector ram air valve 124 until the error term of the duct air temperature is below the predetermined value. The closed control loop may be a PID control loop, for example. In one embodiment, the closed control loop may be a PI control loop. In one embodiment, the closed control loop may be a P control loop.

The controllable heating method 400 may repeat continuously or on a predetermined schedule (e.g., once a second, once a minute, etc.) to reach and maintain the desired temperature.

In some embodiments, optional steps 450, 452, and 454 are performed in which an occupied compartment temperature is used to inform the calculation of the target duct air temperature in step 422. These optional steps may be used to provide a more accurate temperature control for the compartment 60 compared to only measuring the duct air temperature.

In an optional step 450, the target occupied compartment temperature is calculated. In an example of step 450, the controller 210 calculates that the target occupied compartment 60 temperature is 75 degrees Fahrenheit. The controller 210 may calculate this based on the positioning of the temperature selection control 174 in step 420.

In an optional step 452, the occupied compartment temperature is determined. In an example of step 452, the controller 210, via the compartment temperature sensor 164, determines that the measured temperature of the occupied compartment 60 is about 65 degrees Fahrenheit.

In an optional step 454, the occupied compartment temperature error is calculated. In an example of step 454, based on steps 450 and 452, the controller 210 calculates the difference between the target temperature (e.g., 75 degrees Fahrenheit) and the actual temperature (e.g., 65 degrees Fahrenheit) of the occupied compartment 60 to determine the temperature error. If optional step 454 is performed, controllable heating method 400 provides the occupied compartment temperature error value to step 422.

Optional steps 450, 452, and 454 may be performed continuously while controllable heating method 400 is ongoing. In this embodiment, it may be advantageous for the temperature of the occupied compartment 60 to be measured and used for calculating the target duct air temperature, thereby indirectly affecting the modulation of the temperature control valve 114 in step 444. For example, if the temperature of the occupied compartment 60 is approaching the desired temperature received in step 420, controllable heating method 400 may be able to adjust the calculations of the target temperature of the duct air 142 in step 422 (e.g., lowering the target temperature of the duct air 142). As such, controllable heating method 400 may help to prevent overshooting the desired temperature and therefore requiring a readjustment. Thus, optional steps 450, 452, and 454 may not be required for the proper functioning of controllable heating method 400 but may offer advantages as described above.

Controllable heating methods 300/400 greatly improve the comfort and safety of passengers in said unpressurized aircraft, while optimizing efficiency of heating an aircraft while the aircraft is performing other energy required processes. Controllable heating method 300/400 and heating system 50 improve efficiency of heating an unpressurized aircraft by first allowing bleed air 42 and temperature control air 112 to flow through the heat exchanger 130 and then through the ejector 140. Placement of said ejector 140 downstream of said heat exchanger 130 allows the greatest difference in temperature between the bleed air 42 and temperature control air 112 received by the heat exchanger 130, resulting in a more efficient heat transfer between the bleed air 42 and the temperature control air 112. Furthermore, this reduces required size and weight of said heat exchanger 130, therein enhancing efficiency of the unpressurized aircraft.

Controllable heating method 300/400 and heating system 50 improve the flexibility of regulating the temperature of the occupied compartment 60. For instance, in one scenario the occupied compartment 60 may be occupied by passengers. Said passengers may desire a minimum air temperature of 75 degrees Fahrenheit, which may be achieved by the controllable heating method 300/400 and heating system 50. In another example, the occupied compartment 60 may be occupied by temperature-sensitive cargo. Said temperature-sensitive cargo may require a minimum air temperature of 45 degrees Fahrenheit and a maximum air temperature of 95 degrees Fahrenheit, which may be achieved by the controllable heating method 300/400 and heating system 50.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A heating system for an unpressurized aircraft, said heating system comprising:
   a first ram air source configured to provide ram air to a heat exchanger via a first valve;
   a bleed air source from a turbine engine configured to provide bleed air to the heat exchanger via a second valve, wherein the heat exchanger uses the ram air to cool the bleed air;
   an ejector fluidly coupled downstream of the heat exchanger to receive cooled bleed air from the heat exchanger;
   a second ram air source configured to provide ram air to the ejector via a third valve, wherein the ejector mixes the second ram air source with the cooled bleed air;
   a controller operatively connected to the first valve, the second valve, and the third valve;
   a control panel operatively connected to the controller, comprising:
      a heating enable switch,
         wherein the heating enable switch comprises an on configuration and an off configuration; and
      a temperature selection control,
         wherein the temperature selection control is configured to receive a desired temperature range; and
   the controller is configured to regulate air temperature in the unpressurized aircraft by controlling the first, second, and third valves based on the temperature selection control when the heating enable switch is in the on configuration.

2. The heating system of claim 1, comprising a temperature sensor disposed in a duct downstream of the ejector, wherein the temperature sensor is configured to provide a duct air temperature value to the controller.

3. The heating system of claim 1, comprising:
   an occupied compartment within the unpressurized aircraft; and
   a temperature sensor disposed in the occupied compartment, wherein the temperature sensor is configured to provide an occupied compartment air temperature value to the controller.

4. The heating system of claim 1, wherein when the heating enable switch is in the off configuration, automatically positioning the first, second, and third valves via the controller based on predetermined criteria without considering the desired temperature range.

5. The heating system of claim 1, wherein the temperature selection control comprises an outside air temperature input, wherein the outside air temperature input is selected from one of two outside air temperature ranges of temperatures.

6. The heating system of claim 1, wherein controller is configured to independently control a position of the first valve, the second valve, and the third valve to each have one of the following positions: 1) a fully closed position; 2) a fully open position; 3) a partially open position; or, 4) a modulated position based on a duty cycle.

7. A method for heating an unpressurized aircraft, comprising:
   receiving, via a controller, a desired air temperature from a control panel;
   calculating, via the controller, a target duct air temperature based on the desired air temperature;
   determining, via the controller, an actual duct air temperature via a duct air temperature sensor disposed in an air duct;
   calculating a target modulation of one or more ram air valves based on a difference between the target duct air temperature and the actual duct air temperature;
   modulating one or more of the ram air valves via the controller based on the target modulation;
   introducing a bleed air from a turbine engine to a heat exchanger;
   introducing a temperature control air from one of the one or more ram air valves to the heat exchanger for cooling the bleed air to provide a temperature-controlled air;
   mixing the temperature-controlled air from the heat exchanger with an ejector ram air in an ejector; and
   providing air from the ejector to an occupied compartment of the unpressurized aircraft via the air duct.

8. The method of claim 7, further comprising:
   calculating a target ejector ram air valve position based on a flight position and the desired air temperature;
   determining a measured ejector ram air valve position from a position sensor;
   determining an error term based on the difference between the target ejector ram air valve position and the measured ejector ram air valve position;
   maintaining an ejector ram air valve position when the error term is less than a predetermined value; and
   adjusting the ejector ram air valve position based on the error term when the error term is greater than the predetermined value.

9. The method of claim 7, further comprising:
   calculating a target occupied compartment temperature based on the desired air temperature;
   determining a measured occupied compartment temperature from a compartment temperature sensor;
   calculating an occupied compartment temperature error based on the difference between the target occupied compartment temperature and the measured occupied compartment temperature; and
   providing the occupied compartment temperature error to the controller for determining the target duct air temperature.

10. The method of claim 7, wherein when a heating enable switch is in an off configuration, automatically positioning the one or more ram air valves via the controller based on predetermined criteria without considering the desired air temperature.

11. The method of claim 8, comprising:
   determining a flight position; and
   setting the target ejector ram air valve position to a predetermined angle that avoids conflict with a temperature control valve when the flight position is determined to be an in air flight position.

12. The method of claim 8, comprising determining an engine fire status, wherein upon determining that there is an engine fire, directing an ejector ram air motor via the controller to position the ejector ram air valve in a fully closed position.

13. A method for heating an unpressurized aircraft, comprising:
   providing a desired air temperature to a controller via a control panel;
   calculating, via the controller, a target duct air temperature based on the desired air temperature;
   determining, via the controller, an actual duct air temperature via a duct air temperature sensor;
   determining a temperature error based on a difference between the actual duct air temperature and the target duct air temperature;

calculating a target ejector ram air valve position based on the temperature error;

determining a measured ejector ram air valve position from a position sensor;

determining a valve error based on the difference between the target ejector ram air valve position and the measured ejector ram air valve position;

maintaining a position of an ejector ram air valve when the valve error is less than a predetermined value; and adjusting the position of the ejector ram air valve based on the valve error when the valve error is greater than the predetermined value.

14. The method of claim 13, further comprising:

introducing a bleed air from a turbine engine and ambient air received from a first air inlet to a heat exchanger to provide a temperature-controller air;

receiving ambient air from a second air inlet via the ejector ram air valve to provide an ejector ram air;

mixing the temperature-controlled air from the heat exchanger with the ejector ram air in an ejector to provide a mixed air; and providing the mixed air from the ejector to an occupied compartment of the unpressurized aircraft via a duct.

15. The method of claim 14, further comprising:

controlling an amount of ambient air received from the first air inlet via a temperature control valve;

determining whether the unpressurized aircraft is on the ground;

opening fully the temperature control valve when the aircraft is on the ground; and modulating the temperature control valve when the aircraft is in the air.

16. The method of claim 15, wherein modulating the temperature control valve comprises adjusting a duty cycle of the temperature control valve.

17. The method of claim 15, further comprising:

controlling an amount of bleed air received from a turbine engine via a bleed air valve; and providing a heating enable switch, wherein, when the heating enable switch is in an off configuration, automatically positioning the ejector ram air valve, the temperature control valve, and the bleed air valve via the controller based on predetermined criteria without considering the desired air temperature.

18. The method of claim 17, wherein when the aircraft is in the air, setting the ejector ram air valve position to a predetermined angle that avoids conflict with the temperature control valve.

19. The method of claim 13, further comprising:

calculating a target occupied compartment temperature based on the desired air temperature;

determining a measured occupied compartment temperature from a compartment temperature sensor;

calculating an occupied compartment temperature error based on the difference between the target occupied compartment temperature and the measured occupied compartment temperature; and providing the occupied compartment temperature error to the controller for determining the target duct air temperature.

20. The method of claim 13, comprising determining an engine fire status, wherein upon determining that there is an engine fire, directing an ejector ram air motor via the controller to position the ejector ram air valve in a fully closed position.

* * * * *